United States Patent [19]

Schlichte

[11] 4,198,546

[45] Apr. 15, 1980

[54] TIME DIVISION MULTIPLEX SWITCHING NETWORK

[75] Inventor: Max Schlichte, München, Fed. Rep. of Germany

[73] Assignee: Siemens Aktiengesellschaft, München, Fed. Rep. of Germany

[21] Appl. No.: 955,251

[22] Filed: Oct. 27, 1978

Related U.S. Application Data

[63] Continuation of Ser. No. 759,273, Jan. 14, 1977, abandoned.

[30] Foreign Application Priority Data

Jan. 23, 1976 [DE] Fed. Rep. of Germany ....... 2602570

[51] Int. Cl.³ .......................................... H04Q 11/04
[52] U.S. Cl. .................................. 370/58; 179/18 GF
[58] Field of Search ....... 179/15 AT, 15 AQ, 18 GF, 179/18 AG

[56] References Cited

U.S. PATENT DOCUMENTS 3,735,049  5/1973  Buchner ................. 370/68
3,812,294  5/1974  Pedersen ................ 370/68

*Primary Examiner*—David L. Stewart
*Attorney, Agent, or Firm*—Schuyler, Birch, McKie & Beckett

[57] ABSTRACT

A time division multiplex (TDM) switching network having TDM switching units which, through time position conversion, selectively assign time slots on connected TDM lines is described. The TDM lines are formed into a matrix, the crosspoints of which are connected by the TDM aforementioned switching units. The TDM switching units have a fixed traffic capacity which is defined by the maximum number of time slot connections that the switching units are capable of making between the TDM lines connected thereto. The fixed traffic capacity of the switching units is dependent on the size of the TDM switching network but smaller than the maximum rated traffic capacity of the TDM lines. As a result, in the event the TDM switching network is expanded, the fixed traffic capacity of the additional TDM switching units can be progressively reduced.

5 Claims, 4 Drawing Figures

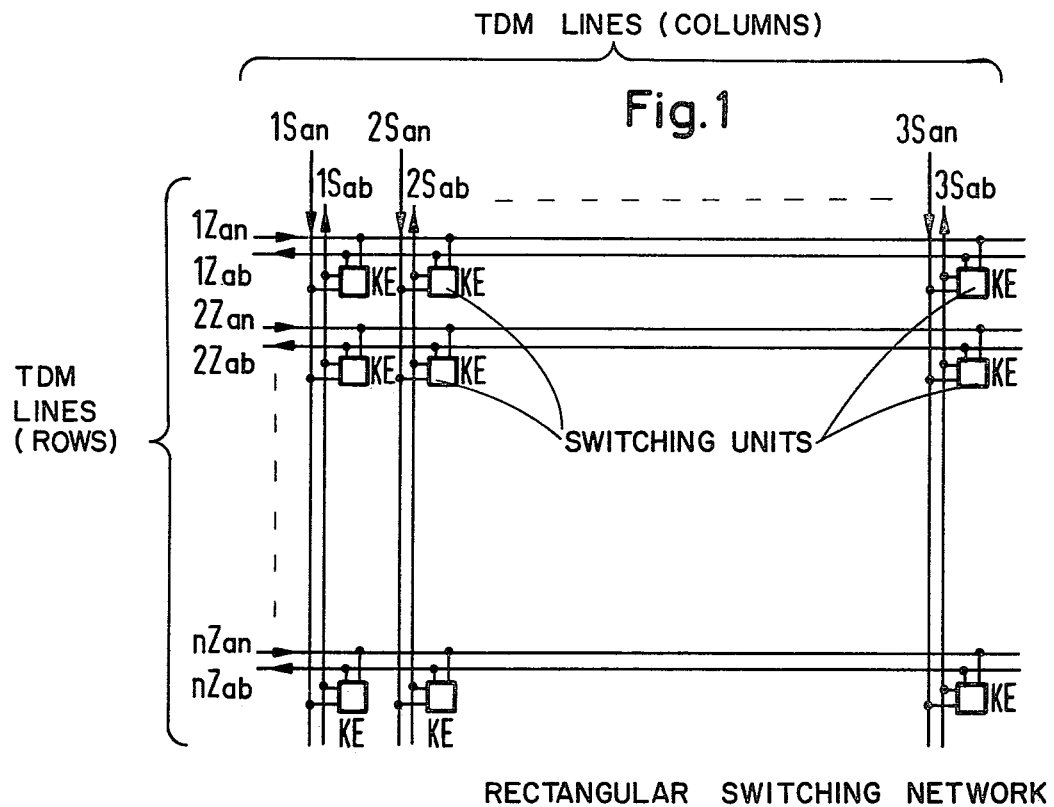
RECTANGULAR SWITCHING NETWORK
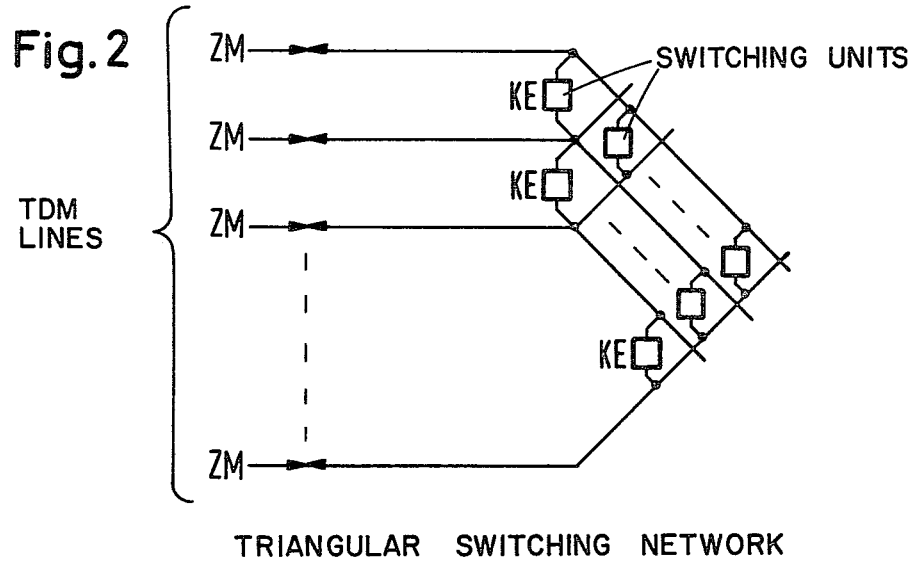
TRIANGULAR SWITCHING NETWORK

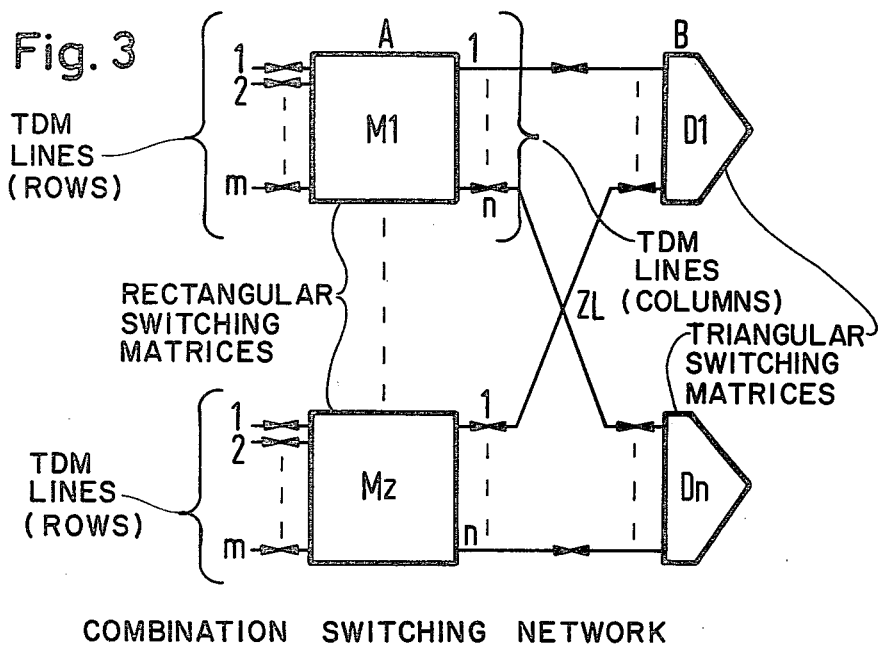
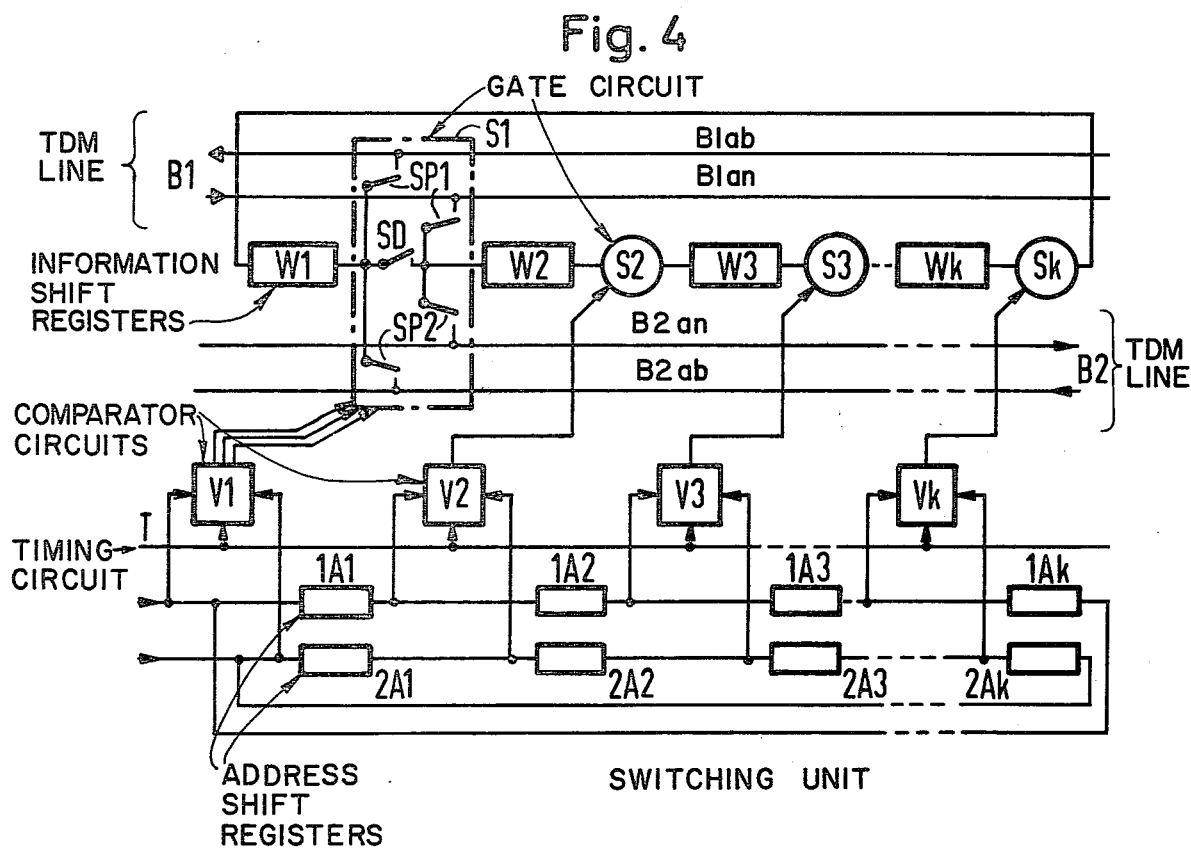

TIME DIVISION MULTIPLEX SWITCHING NETWORK

This is a continuation, of application Ser. No. 759,273, filed Jan. 14, 1977 now abandoned.

BACKGROUND OF THE INVENTION

The invention relates to a time division multiplex (TDM) switching network having switching units which, through time position conversion, cause mutual allocation time slots formed on connected TDM lines.

TDM switching networks wherein the switching between time slots formed on the connected TDM lines takes place only through time position conversion by means of appropriate timing circuits are old in the art, as exemplified in West German Offenlegungsschriften 2 025 102 and 2 064 202.

These prior art TDM switching networks have the configurations of conventional space division multiplex switching networks which are based on a three-stage basic design. With a greater number of terminals for TDM lines, one changes over to switching arrangements having a still greater number of stages (e.g., five stages). However, this case involves a huge expansion step, for example, leading from 16,000 to 500,000 simultaneously possible connections.

Therefore, if the expansion is to be effected in smaller steps, the three-stage basic design is adhered to and the original switching network is double (West German Offenlegungsschrift 2 064 202). However, to achieve this, it is necessary that the timing circuits located in the intermediate switching network stage be designed for the connection of still a greater number of links than are necessary for the simple basic switching network whereby, in the interest of providing for expansion possibilities, the greater number of link terminals is provided in advance.

With regard to the feasibility of constructing the switching units as integrated circuits, it is of interest to work with switching units of but one basic design. However, it is of interest to have switching units having only a small number of line terminals. Generally speaking, it is also of interest to have a switching network design that may be used uniformly for all the sizes of the switching network and which allows the switching network to be expanded in small steps.

SUMMARY OF THE INVENTION

In accordance with the invention, a TDM switching network of the type mentioned hereinabove is provided wherein the TDM lines form a matrix-type arrangement. The crosspoints of which they may be connected via TDM switching units linked to column TDM lines and to row TDM lines. The TDM switching units have a fixed traffic-handling capacity smaller than the maximum rated traffic capacity of the TDM lines. The fixed traffic capacity of the switching units, which is dependent on the size of the switching network, decreases with increasing size of the TDM switching network.

In this switching network design, very small as well as very large switching networks are constructed in the same fashion. The TDM switching units have only a few, i.e., only two, TDM line terminals, and expansion of the switching network is possible in small steps. For example, expansion can be carried out by connecting single additional horizontal and/or column lines using additional switching units. Thusly constructed switching networks have only very few switching network stages even if the number of terminals is great.

According to a further specific embodiment of the invention, there are provided network configurations which are based on the switching network unit designed in accordance with the teachings of the invention.

BRIEF DESCRIPTION OF THE DRAWINGS

The principles of the invention are described in greater detail hereinbelow through the description of preferred embodiments which are illustrated in the drawings, wherein:

FIGS. 1–3 are schematic diagrams of three examples of TDM switching networks in accordance with the invention, and FIG. 4 is a schematic diagram of a preferred embodiment of a switching network unit for constructing TDM switching networks according to the invention designed such as those described in connection with FIGS. 1–3.

DETAILED DESCRIPTION OF THE PREFERRED EMBODIMENTS

The switching network shown in FIG. 1 is concerned with forming connections for pulse code modulation (PCM) TDM lines, each of which comprises a separate pair of line wires for both directions of transmission.

In the illustrated switching network, the horizontal TDM lines (1Zan; 1Zab-nZan) and vertical TDM lines (1San; 1Sab-mSan; mSab) form a matrix-type arrangement wherein, depending on whether $n=m$ or $n \neq m$, a squared or rectangular switching matrix may be involved. The TDM lines of the switching matrices may be interconnected on their respective crosspoints via a switching matrix unit or TDM switching unit KE linked on one side to the two pairs of line wires of a horizontal line and, on the other, to the two pairs of line wires of a vertical line.

The TDM switching units KE are units which, through true time position conversion, cause time slots on the connected TDM lines to be assigned selectively.

The traffic-handling capacity of the switching network units is smaller than that corresponding to the maximum rated traffic capacity of the TDM lines, i.e. if, for instance, a TDM system PCM 3P/32 is based on 32 time slots formed on the individual TDM lines, fewer than 32 connections can be established simultaneously via the switching units KE. The traffic-handling capacity of the switching units KE is adapted to the size of the switching network so that, in the case of larger switching networks, the traffic-handling capacity of the additional individual switching units KE can be progressively reduced and vice versa. Thus, it is not uneconomical to adhere to the switching network designed in accordance with the invention in the case of large switching networks wherein the traffic between any two intersecting TDM lines is lighter than in small switching networks.

Compared to switching networks wherein a separate switching is provided for each TDM line, the switching network design in accordance with the invention has the advantage that a failure of a switching unit does not necessarily lead to the loss of the whole traffic on a specified TDM line.

If, as assumed, the TDM lines are four-wire lines, it is not possible with the trunking scheme shown in FIG. 1 to readily establish connections between TDM lines of the same type, e.g., between two row TDM lines. As will be further explained below, the trunking scheme shown in the figure is particularly suitable for use as a part of larger switching networks, in which case the one type of TDM lines (e.g., row TDM lines) are links establishing a connection with additional switching matrices within the switching network. There are no such restrictions if the TDM lines are two-wire lines. Instead, one can, for example, establish a connection between two row TDM lines via a first switching network unit, a column TDM line and via an additional switching unit.

Other switching configurations embodying the invention will be described in FIGS. 2 and 3.

A switching matrix having the form of a triangular or cut switching matrix is shown in FIG. 2.

This switching matrix may be visualized as one half of a squared switching matrix cut along a diagonal line, the crosspoint element of the crosspoints on the line of intersection being replaced by electrical connections, which constitute at the same time terminals for the pairs of line wires of the TDM lines. In the presence of m such TDM lines, the triangular switching matrix requires $m(m-1)/2$ switching units KE. In this case, connections are possible between the individual TDM lines ZM via one switching unit KE only.

FIG. 3 shows an exemplary trunking arrangement of a switching network according to the invention which in the A stage consists of rectangular switching matrices (FIG. 1) and in the B stage of triangular switching matrices (FIG. 2). In this case, there are Z rectangular switching matrices of the A stage with m input TDM lines which, for example, are the horizontal lines of FIG. 1 and n output TDM lines which, therefore, are column TDM lines; n triangular switching matrices with m terminals each are required. A connection between each vertical line of the switching matrices of the A stage with one terminal at a time of the n triangular switching matrices of the B stage can be established by means of links ZL. Connections which can be established between the row TDM lines of the switching matrices of the A stage run in this trunking scheme via three switching units KE, i.e., via a first switching unit of a switching matrix of the A stage, a second switching unit of a triangular switching matrix of the B stage, and again over the same or over another switching unit of switching matrices of the A stage.

The construction and operation of a switching unit for the switching networks according to the invention will now be described with reference to FIG. 4.

The switching network unit of FIG. 4 has a number of information shift registers W1-Wk, whose number depends on the traffic-handling capacity of the switching network unit, i.e., on the connections that can simultaneously be established over it. The individual shift registers W consist of a number of shift register stages equaling the number of bits per PCM word. In the case of a PCM system 30/32 there are 8 shift register stages.

The outputs of the last shift register stages of the shift registers W can each be connected to the input of the first shift registers stage of the subsequent shift register W over a switching path of gate circuit S1, of which in the figure only the switching path SD located between the shift registers W1 and W2 is shown and which in this case, for purposes of illustration, has the form of a mechanical contact. In this way the shift registers W form a shift register ring.

A pair of switches SP1 and a pair of switches SP2 of gate circuit S1 are connected to the outputs and inputs of successive shift registers W, respectively, in addition to the aforementioned switch SD. The switches in each pair of switches SP1 and SP2 operate simultaneously as further described in detail below. The operation of each pair of switch SP1 and SP2 takes place alternatively to a connection through the switching path SD. Here, too, only the switches SP1 and SP2 connected to an output or input of the shift registers W1 and W2 are shown.

Using the pair of switches SP1 either a connection can be established between the shift register output of the last stage of shift register W1 and the outgoing pair of line wires B1ab of the first PCM/TDM line B1 connected to the switching unit or a connection between the incoming pair of line wires B1an of the PCM/TDM line B1 and the input of the first shift register stage of the second shaft register W2. The second pair of switches SP2 serves for a connection between the output of the shift register W1 and the outgoing pair of line wires B2ab of the second PCM/TDM line B2 connected to the switching unit or for the connection between the incoming pair of line wires B2an to the PCM/TDM line B2 and the input of the second shift register W2. The aforesaid pairs of switches SP1 and SP2 are activated only during the time positions of time slots to be connected to one another and formed on the PCM/TDM lines B1 and B2. The pairs of switches SP1 and SP2 in gate circuits S2-Sk are properly connected to the outputs or inputs of the rest of the shift registers W1-WK.

To operate the gate circuits S1-Sk, the switching unit according to the invention has two shift register rings 1A1-1Ak and 2A1-2Ak for storing switching addresses with the same number k of shift register A as the information shift register ring W1-Wk. The number of shift register stages in the shift registers A is the same as that of information shift registers W. The shift registers A of the rings of shift registers are assigned to gate circuits S1-Sk, which are connected between the individual information shift registers W, in accordance with by the last digit of their reference symbols, i.e., the address shift registers 1A1 and 2A1 are assigned to the gate circuit S1 lying between information registers W1 and W2, the address shift registers 1A2, 2A2 are assigned to the gate circuit S2, etc. A comparator circuit V is assigned to equal-ranked pairs of address shift registers A. The comparator circuit V is connected to the inputs of address shift registers A. There is likewise connected to the comparator circuit V a timing circuit T on which code words are transmitted in successive cycles which mark time positions. These code words are delayed by one time slot in relation to the time position formation of the PCM/TDM lines. That means, for example, that during the time position of time slot 5 there already appears on the timing circuit T the time position code word marking the time position of time slot 6.

The clock pulse comparator circuits V operate such that, if there is coincidence between a time slot address read from an address shift register of one ring (e.g., 1A1) and the currently appearing time position code word from timing circuit T, the switches of one pair of switches (e.g., SP1) are activated. If there is agreement between a time slot address read from the address shift register of the other ring (e.g., 2A1), and the time position code word, activate the switches of the other pair of relevant switches (e.g., SP2) are activated. In the absence of an agreement between the two time slot addresses and the time slot code word, the switch SD between the output and input of adjacent information shift registers W is activated. This is shown in the figure illustrating the comparator V1 by a triple connection with the gate circuit S1 emanating therefrom.

A code with only 5 code signal bits suffices to represent the time slot addresses. However, since, as mentioned earlier, the address shift registers A have just as many shift register stages as the information shift registers W (in this case 8 stages), 3 additional bits, which are not necessary for representing addresses, may be input into said address shift registers A. One of these additional bits is employed prior to the comparison of the address bits by the comparator section of the comparator circuits V to set an integrator which follows the comparator section. At the end of the comparison, the second of the additional bits causes the contents of the integrator to be transferred to a subsequent holding element. The third of the additional bits is used to reset the integrator. The structure of such a comparator is illustrated in West German Offenlegungsschrift 4 419 251.

The operating mode of the switching network shown in FIG. 4 will be described with reference to FIG. 4, whereby switching is considered between time slot 10 on the first TDM line B1 connected to the switching network unit and time slot 15 on the second connected TDM line B2. It is assumed that 15 simultaneous connections can be established by the switching network unit KE shown in FIG. 4, so that 15 information shift registers W1-W15 are provided.

In describing the operation of the switching unit of FIG. 4, a point in time is assumed at which: (1) information coming from time slot 10 of TDM line B1 is in information shift register W2, the second address shift register 1A2 of the first address shift register ring stores the address of time slot 10; and (3) the second address shift register 2A2 of the second address shift register ring stores the address of time slot 15. The address of time slot 10 has been transferred during time slot 9 from the first shift register 1A1 to the shift register 1A2 and is offered simultaneously to comparator V2. As mentioned above, the time position code occurring on timing circuit T, in successive cycles, follows by one time position the actual time slot condition on the TDM lines. As a result, during the actual time position of time slot 9, the time slot code word for time slot 10 appears at the comparator V2 which establishes coincidence between the time slot code word and the time slot address in the manner described above. Coincidence in the comparator V2 causes, at the end of the time position of time slot 9, the transfer of an enabling signal for the pair of switches SP1 of the gate circuit S2 to the holding element of comparator V2. Thus, at the start of the time position of the tenth time slot, these switches SP1 are activated, i.e., the PCM information of time slot 10 incoming on the incoming pair of line wires B1an is written serially into the information shift register W3 and the information in the information shift register W2 is read to outgoing pair of line wires B1ab of the TDM line B1.

The two addresses of time slot 10 and time slot 15 have been written into the third address shift registers 1A3 and 2A3, respectively, and they have also been compared by comparator V3 with the time position code word on line T. The absence of coincidence in this case leads to the application of an enabling signal to the switches SD of the gate circuit S4. Thus, the PCM information coming from time slot 10 held in information shift register W3 is passed on to the subsequent information shift register W4.

The above described processes are repeated until, at the end of the 14th time slot, the PCM information is in information shift register W8. At this point in time, the comparator V8 has established coincidence between the time position code appearing on line T and the address of time slot 15 held in address shift register 2A8 of the second address shift register ring. As a result of this coincidence, an enabling signal activates the pair of switches SP2 of the gate circuit S8. This means that, during time slot 15, the PCM information coming originally from time slot 10 on the incoming pair of line wires B1an of TDM line B1, and held in information shift register W8, is read out to the outgoing pair of line wires B2ab. Also during time slot 15, PCM information incoming on the incoming pair of line wires B2an of the TDM line B2 travels to information shift register W9.

In the manner described hereinabove for the PCM information coming from time slot 10 on TDM line B1, the PCM information incoming during time slot 15 on TDM line B2 is now shifted by one information shift register W from time slot to time slot until, during time slot 10 of the subsequent pulse frame the PCM information is read out to outgoing pair of line wires B1ab of TDM line B1. At the same time PCM information is read in from the incoming pair of line wires B1an of the PCM/TDM line B1 and the above described operation is repeated. For this purpose the PCM information must pass through the shift register ring more than once.

Since for each connection, during the time frames of the time slots only one information shift register W, as well as the associated pair of address shift registers A and the associated comparator V, are used, further connections can be established simultaneously in the same way via the switching unit KE.

If, as assumed in the practical example above, the number of time slots per TDM line and the number of information shift registers have 1 as the greatest common divisor, all the combinations of switches for inputting and outputting PCM information are utilized during a single connection. This has the advantage that the whole switching arrangement can be checked by testing a single connection.

The principles of the invention are described hereinabove by describing preferred embodiments constructed and operating accordingly.

The described embodiments are to be considered only as being exemplary, and it is contemplated that they can be modified or changed in ways known to those skilled in the art while remaining within the scope of the invention as defined by the appended claims.

I claim:

1. A time division multiplex (TDM) switching network having a plurality of TDM lines for carrying PCM information in a predetermined number of time slots corresponding to a maximum rates traffic capacity, said TDM switching network comprising:
   a matrix-like arrangement of said TDM lines in a first and second group of TDM lines corresponding to rows and columns, said rows and columns thereby forming a plurality of crosspoints; and
   a plurality of TDM switching units each connected at one of said crosspoints in said matrix-like arrangement for selectively assigning time slots to the TDM lines connected thereto by time position conversion, each of said TDM switching units having a fixed traffic capacity defined by the maximum number of time slot connections that said switching unit is capable of making between said TDM lines, said fixed traffic capacity being dependent on the size of said TDM switching network but less than the maximum rated traffic capacity of said TDM lines, wherein the fixed traffic capacity of said TDM switching units in a large TDM switching network is smaller than in a small TDM switching network so that, in the event said TDM switching network is expanded, the fixed traffic capacity of the additional TDM switching units can be progressively reduced.

2. The switching network defined in claim 1 wherein said matrix-like arrangement of TDM lines forms a triangular switching matrix.

3. The switching network defined in claim 1 wherein said matrix-like arrangement of TDM lines includes three switching stages, wherein at least two of said stages are rectangular-shaped matrices and the third of said stages is a triangular switching matrix and further comprising a plurality of links connecting said second group of TDM lines of said two switching matrices to one of the groups of TDM lines forming the triangular switching matrix.

4. The switching network defined in claim 1 wherein each of said switching units comprises:
a number of information shift registers corresponding to the number of connections to be established simultaneously by said switching unit, each said information shift register having a number of stages equal to the number of bits in a PCM word in a given connection;
first switch means for forming said information shift registers into a ring-like series connection;
second switch means operative as an alternative to said first switch means for forming a connection between an output of one of said information shift registers and a first outgoing TDM line and between an input of the information shift register subsequent in the series connection to said one information shift register and a first incoming TDM line; third switch means also operative as an alternative to said first switch means for forming a connection between the output of said one information shift register and a second outgoing TDM line and between the input of said subsequent information shift register and a second incoming TDM line; and
activating means for activating said second and third switch means only during the time positions of time slots to be connected together.

5. The switching network defined in claim 4 wherein said activating means comprises:
first and second rings of address shift registers, outputs of corresponding ones of the shift registers in said first and second rings being formed into pairs, each pair of address shift register outputs being assigned to one of said information shift registers;
timing circuit means carrying time position code words one time position behind corresponding time slots on said TDM lines;
a plurality of comparator means, each of said comparator means having inputs connected to one of said pairs of address shift register outputs, a third input connected to said timing circuit means and an output connected to said first, second and third switching means connected to the output of the said information shift register associated therewith, said first switching means being activated upon complete lack of coincidence between the inputs to said comparator means, coincidence between one of said address shift register outputs and the time position code word operating said second switch means and coincidence between the other of said address shift register outputs and the time position code word operating said third switch means.

* * * * *